US006911902B2

(12) United States Patent
Fuller et al.

(10) Patent No.: US 6,911,902 B2
(45) Date of Patent: Jun. 28, 2005

(54) PNEUMATICALLY ACTUATED MOUNTING APPARATUS AND METHOD FOR A TIRE INFLATION GAS PARAMETER MONITORING SYSTEM

(75) Inventors: Timothy C. Fuller, Clackamas, OR (US); Melvin M. Priday, Clackamas, OR (US); Alan J. Walters, Cornelius, OR (US)

(73) Assignee: Fuller Bros Inc., Clackamas, OR (US)

( * ) Notice: Subject to any disclaimer, the term of this patent is extended or adjusted under 35 U.S.C. 154(b) by 227 days.

(21) Appl. No.: 10/001,424

(22) Filed: Nov. 13, 2001

(65) Prior Publication Data

US 2002/0039066 A1 Apr. 4, 2002

Related U.S. Application Data

(63) Continuation-in-part of application No. 09/800,599, filed on Mar. 6, 2001, which is a continuation-in-part of application No. 09/330,534, filed on Jun. 11, 1999, now Pat. No. 6,292,095, which is a continuation-in-part of application No. 09/038,761, filed on Mar. 11, 1998, now Pat. No. 6,025,777.

(51) Int. Cl.$^7$ .............................................. B60C 23/00
(52) U.S. Cl. ...................... 340/442; 340/447; 340/539; 73/146.2; 73/146.8
(58) Field of Search ................................ 340/442, 447, 340/539; 73/146.2, 146.8; 200/61.22

(56) References Cited

U.S. PATENT DOCUMENTS

| 4,334,215 | A | | 6/1982 | Frazier et al. .............. 340/539 |
| 4,823,107 | A | | 4/1989 | Pompier ..................... 340/442 |
| 4,909,074 | A | | 3/1990 | Gerresheim et al. ....... 73/146.4 |
| 4,938,056 | A | | 7/1990 | DeRudder et al. ............. 73/49 |
| 4,969,493 | A | * | 11/1990 | Lee .............................. 141/38 |
| 4,998,092 | A | | 3/1991 | Ohno et al. ................. 340/445 |
| 5,050,110 | A | | 9/1991 | Rott ........................... 364/557 |
| 5,081,443 | A | | 1/1992 | Breit .......................... 340/426 |
| 5,193,387 | A | | 3/1993 | Hodate ..................... 73/146.5 |
| 5,228,337 | A | | 7/1993 | Sharpe et al. ............. 73/146.5 |
| 5,230,243 | A | | 7/1993 | Reincke .................... 73/146.3 |
| 5,231,872 | A | | 8/1993 | Bowler et al. ............ 73/146.5 |
| 5,249,609 | A | | 10/1993 | Walker et al. ................ 141/4 |
| 5,335,540 | A | | 8/1994 | Bowler et al. ............ 73/146.5 |
| 5,452,608 | A | | 9/1995 | Green ....................... 73/146.8 |
| 5,460,037 | A | | 10/1995 | Chamussy et al. ........ 73/146.3 |
| 5,483,826 | A | | 1/1996 | Schultz et al. ............ 73/146.5 |
| 5,483,827 | A | | 1/1996 | Kulka et al. .............. 73/146.5 |
| 5,493,925 | A | | 2/1996 | Liegel et al. ............. 73/866.5 |
| 5,569,848 | A | | 10/1996 | Sharp ....................... 73/146.2 |
| 5,591,281 | A | * | 1/1997 | Loewe ....................... 152/418 |
| 5,604,481 | A | | 2/1997 | Lin ............................ 340/442 |
| 5,774,048 | A | | 6/1998 | Achterholt ................. 340/447 |
| 6,293,147 | B1 | * | 9/2001 | Parker et al. ................ 73/462 |

* cited by examiner

*Primary Examiner*—Daryl Pope
(74) *Attorney, Agent, or Firm*—Stoel Rives LLP (57) ABSTRACT

A tire inflation gas telemetry system (30) is installed inside a tire (174) mounted to a wheel (170) and is placed within a protective housing (100) having pneumatic cylinders (116, 126) with piston rods (128, 130) that are extended or retracted by tire inflation gas pressure changes. The housing is suspended by a cable (156) slung around the wheel. The cable is slack or taut depending on motion of a first piston rod, and the telemetry system is pivoted into alternate protected and operational orientations by motion of a second piston rod. When the tire is uninflated, the cable is slack, and the telemetry system is pivoted into the protected orientation. As the tire is inflated, the cable becomes taut causing the housing to be drawn tightly against the wheel, and the telemetry system is pivoted into the operational orientation.

18 Claims, 6 Drawing Sheets

PNEUMATICALLY ACTUATED MOUNTING APPARATUS AND METHOD FOR A TIRE INFLATION GAS PARAMETER MONITORING SYSTEM

RELATED APPLICATIONS

This application is a continuation-in-part of application Ser. No. 09/800,599, filed Mar. 6, 2001; which is a continuation-in-part of application Ser. No. 09/330,534, filed Jun. 11, 1999, now U.S. Pat. No. 6,292,095; which is a continuation-in-part of application Ser. No. 09/038,761, filed Mar. 11, 1998, now U.S. Pat. No. 6,025,777.

TECHNICAL FIELD

This invention relates to tire inflation gas measurement systems and more particularly to a pneumatically actuated apparatus for securely mounting such systems inside tires, such as truck and off-the-road mining truck tires.

BACKGROUND OF THE INVENTION

Giant off-the-road tires, particularly those employed by earth moving and mining ore vehicles, are subjected to very heavy loads that make them susceptible to premature failure unless proper inflation gas pressures are maintained. Such tires are even subject to dangerous explosive failure if the inflation gas includes an oxygen concentration exceeding certain limits. For this reason, many mine truck operators are now using dry nitrogen as an inflation gas. Even so, trapped gases, air leaks, hydrocarbon out-gassing, and osmosis can cause a dangerous oxygen buildup inside the tires.

Figure 1:
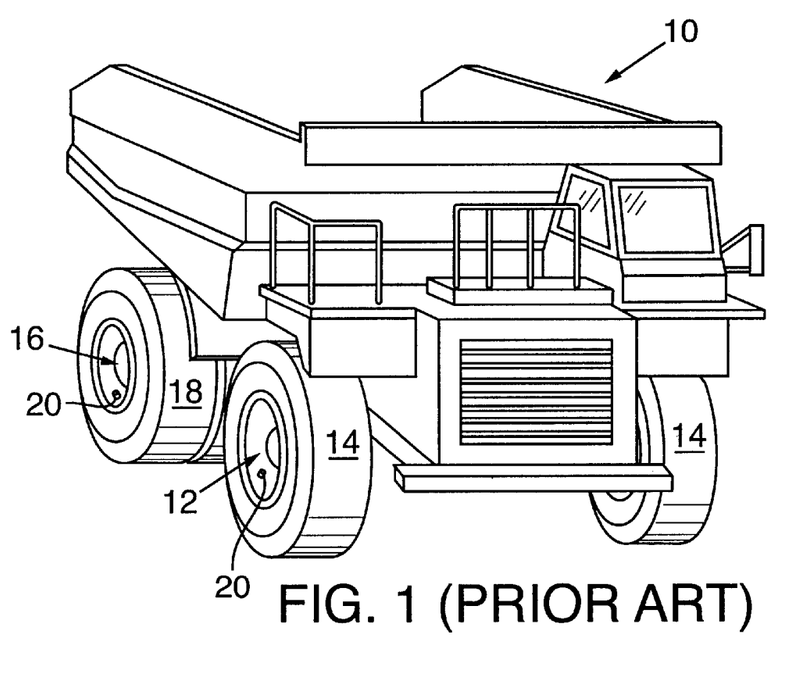
FIG. 1 is an isometric pictorial view of an exemplary prior art ore truck suitable for employing this invention.

FIG. 1 represents a mining ore truck 10, which can weigh up to 550 tons when loaded and carries its heavy loads on only two axles. A front axle 12 has two single tires 14 mounted thereon and a rear axle 16 has two dual tires 18 (only one "dual" shown) mounted thereon, resulting in loads of about 50 tons per tire. A typical tire is inflated through a conventional valve stem 20 (only two shown) to an operating pressure ranging from about 85 to 185 pounds per square inch of gauge pressure ("psig") and, when operating, may have an operating temperature ranging from about 100 to 255 degrees Fahrenheit ("°F."). If the tire pressure is too high, a failure mode (explosion) may occur. However, if the tire pressure is too low, the excess heat generated may cause separation of some of the 18 to 22 tire layers after as few as 300 hours of operation, whereas such tires normally have at least a 1,000 hour operating life. Giant off-the-road tires cost about $25,000 to $30,000 each, and vehicle downtime costs at least about $500 per hour. Clearly, maintaining proper tire operating pressure is an economic and safety imperative.

Unfortunately, conventional tire pressure measurement methods require allowing the tires to cool for about eight hours before an accurate tire pressure measurement and inflation pressure adjustment can be made. The resulting costly downtime often leads to infrequent tire pressure measurements. To make matters worse, tires inflated by conventional air compressors often add water vapor and compression heating of the inflation air, causing errors between the measured and operating air pressures in the tires. Of course, conventional compressed air also includes oxygen. Moreover, off-the-road vehicle operators often add fluids to tires to inhibit rim rust and scale that otherwise makes tire removal difficult. Also, new tires are stored outdoors where they can collect rainwater, some of which inevitably remains in the tire when it is installed on a vehicle. Unfortunately, such fluids have vapor pressures that contribute to pressure measurement errors. Tires operating under these conditions are commonly referred to as "wet" tires. Finally, many off-the-road vehicles operate in cold climates but are maintained in heated facilities, further complicating the tire inflation pressure problem. Unfortunately, conventional gas law equations do not provide solutions to these problems.

There are previously known apparatus and methods for solving some of the above-described problems. In particular, U.S. Pat. No. 5,452,608 for PRESSURE AND TEMPERATURE MONITORING VEHICLE TIRE PROBE WITH RIM ANCHOR MOUNTING describes a tire rim mounted sensor probe and conductor terminal apparatus for sensing the air pressure and temperature inside a tire. When the vehicle stops, a conventional electronic measuring device is electrically connected to the conductor terminal to convert the sensor probe data into pressure and temperature measurements. Unfortunately, the sensor probe is separately mounted through a hole in the rim, a disadvantage that weakens the rim and requires a relatively expensive field retrofit to every rim. If a new rim is required, it similarly has to be retrofitted, adding to the downtime of vehicle. Of course, a tire cool down period may be required to obtain usable readings.

U.S. Pat. No. 5,335,540 for TIRE MONITORING APPARATUS AND METHOD describes a tire pressure and temperature sensing apparatus that employs radio telemetry to continuously monitor tire pressure and temperature while the vehicle is operating. However, as in the above-described patent, the pressure and temperature sensing probe is separately mounted to the rim, which has many of the above-described disadvantages. Moreover, every vehicle must carry a telemeter receiver by which the vehicle driver monitors the tire operating pressures and temperatures.

There are many other patents describing tire pressure and temperature monitoring apparatuses and methods. Some describe sensors embedded in the tires, others describe wheel hub mounted slip rings for conducting sensor data to a vehicle data processor, yet others describe oblate sensor housings loosely floating in the tire interior, and still others describe complex systems for inflating and deflating tires while the vehicle is operating. However, many of these systems either require retrofitting and, thereby, weakening a wheel rim, or provide a sensor mounting within the tire interior that can somehow contact or damage the inner walls of the tire, potentially leading to premature tire failure. Accordingly, tire manufacturers are increasingly unwilling to guarantee tires that are subject to potential damage from "foreign" objects inside the tire while, at the same time insisting on proper tire inflation pressures to limit their exposure to product liability. It is probable that the United States government may require vehicle manufacturers to provide tire pressure sensing apparatus in future cars and trucks.

What is needed, therefore, is an accurate tire inflation gas measuring system that does not require a cool down time, does not require expensive retrofitting or weakening of tire rims, does not contact the tire interior, accounts for sources of measurement errors, is readily transferred among tires and vehicles, and is usable on a wide variety of tire and wheel combinations.

SUMMARY OF THE INVENTION

An object of this invention is, therefore, to provide an apparatus and a method for measuring tire inflation gas parameters without requiring a tire cool down period.

Another object of this invention is to provide an apparatus and a method for measuring tire pressure and temperature without resorting to expensive retrofitting or weakening of tire rims.

A further object of this invention is to provide a tire pressure and temperature measuring apparatus and a method that is readily transferable among tires and vehicles and is usable with a wide variety of tire and rim combinations.

Yet another object of this invention is to provide an apparatus for mounting such an apparatus within the interior of a tire without contacting the tire or retrofitting the wheel rim.

A tire inflation gas parameter monitoring system of this invention is installed inside a tire being monitored and includes a telemetry system placed within a protective housing enclosing first and second tire inflation gas pressure actuated cylinders in which respective first and second pistons and associated connecting rods are biased in respective extended and retracted positions by gas pressure stored in associated gas pressure reservoirs. As the tire is inflated by the tire inflation gas pressure, the first and second pistons and associated connecting rods are reverse actuated to respective retracted and extended positions.

The protective housing is suspended by a cable slung around a wheel to which the tire is mounted. The cable runs from one end of the housing, over the wheel, through an opening in the other end of the housing, and connects to the first connecting rod. The cable is of such a length that when the first connecting rod is in the extended position, the cable is slack and the protective housing is suspended away from the wheel. However, when the first connecting rod is in the retracted position, the cable is drawn taut and the protective housing is drawn into firm contact with the wheel.

When the second connecting rod is in the retracted position, the telemetry system is pivoted by the connecting rod to a protected orientation within the protective housing, and when the second connecting rod is in the extended position, the telemetry system is pivoted to an operational orientation with its antenna extending into the tire interior.

In operation, when the tire is uninflated, the cable is slack causing the protective housing to be loosely suspended below the wheel, and the telemetry system is pivoted into the protected orientation. This provides easy mounting or unmounting of the protective housing to the wheel and protects the telemetry system from damage during tire changes. After the tire is mounted to the wheel and the tire is inflated, the cable becomes taut causing the protective housing to be drawn tightly against the wheel, and the telemetry system is pivoted into the operational orientation.

An advantage of this invention is that it eliminates the need for drilling mounting holes in the wheel and, thereby, prevents weakening of the wheel.

Another advantage of this invention is that it provides sufficient separation of the antenna from the floor of the tire to provide adequate communications efficiency of the telemetry system through the side walls of the tire.

Yet another advantage of this invention is that the protective housing is prevented from contacting and potentially damaging any inner surfaces of the tire.

Additional objects and advantages of this invention will be apparent from the following detailed description of a preferred embodiment thereof that proceed with reference to the accompanying drawings.

DETAILED DESCRIPTION OF PREFERRED EMBODIMENT

This application is related to copending application Ser. No. 09/800,599, filed Mar. 6, 2001; and U.S. Pat. Nos. 6,292,095 and 6,025,777, for OFF-THE-ROAD TIRE TEMPERATURE AND PRESSURE MONITORING SYSTEM; all of which are assigned to the assignee of this application and are incorporated herein by reference.

Figure 2:
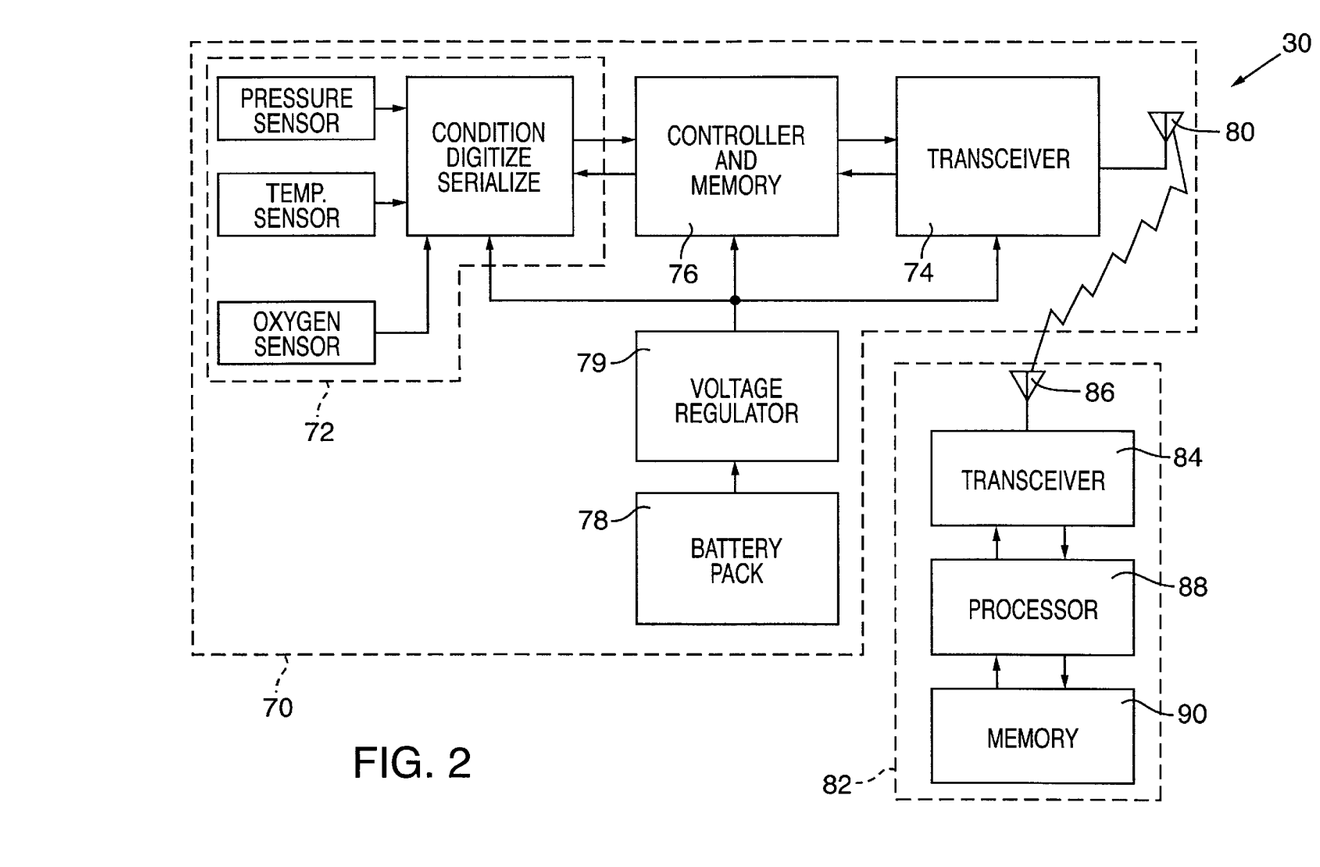
FIG. 2 is an electrical block diagram of a tire inflation gas parameter measuring system of this invention.

FIG. 2 schematically shows a telemetry system 30 that is suitable for use with this invention in which a housing 70 encloses tire inflation gas parameter sensors, such as a pressure, temperature, and oxygen sensors 72, a data transceiver 74, a controller 76, a battery pack 78, and associated voltage regulator 79. Housing 70 is preferably cylindrically shaped with a flexible quarter-wavelength monopole antenna 80 protruding from one of the circular end surfaces of housing 70. Field testing has revealed that when data transceiver 74 is inside a tire, antenna 80 should be positioned at least 10 inches off the tire floor to increase transmission efficiency through the tire side wall.

Sensed tire inflation gas parameter data are telemetered by transceiver . 74 to a remote measurement system 82 while the vehicle is in operation. Tire life can be significantly improved by remotely measuring tire the inflation gas parameters at the end of each ore-transporting run, computing in remote measurement system 82 any tire pressure and gas changes required, and adjusting same accordingly before the next run. The computing and sensing is carried out as described in U.S. Pat. No. 6,025,777, and copending application Ser. No. 09/800,599.

Controller 76 includes a model MC68HC11 CMOS microprocessor that is manufactured by Motorola, Inc. located in Phoenix, Ariz. The microprocessor includes on-chip random access memory and electrically erasable programmable read-only memory to support program memory and data transmission functions. Data transceiver 74 is a conventional 900 MHz data transceiver, such as ones employed in wireless telephones. Because it employs on-demand burst data transmission, telemetry system 30 has a very low standby power drain, resulting in a typical battery lifetime of about one year when lithium batteries are employed.

Remote measurement system 82 includes a data transceiver 84 and an antenna 86 that intercommunicate with data transceiver 74 and antenna 80. Data transceiver 84 intercommunicates with a processor 88, such as a conventional laptop personal computer that includes a memory 90. Because remote measurement system 82 is preferably handheld, processor 88 and memory 90 are preferably a model PC9000-A/D manufactured by DAP Technology Corporation of Tampa, Fla. Of course, a wide variety of PC types are usable including tower, rack, laptop, and desktop versions.

Figure 3:
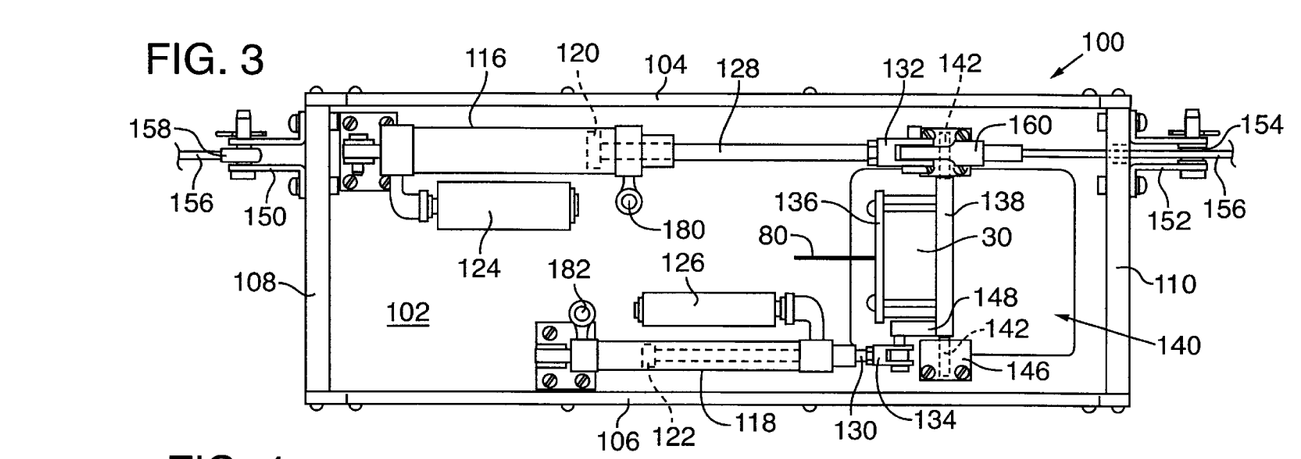
FIG. 3 is a plan view of a protective housing for a telemetry package showing tire inflation gas pressure actuated cylinders in a tire uninflated position for respectively slinging the housing to a wheel and positioning the telemetry package in a protected orientation.
Figure 4:
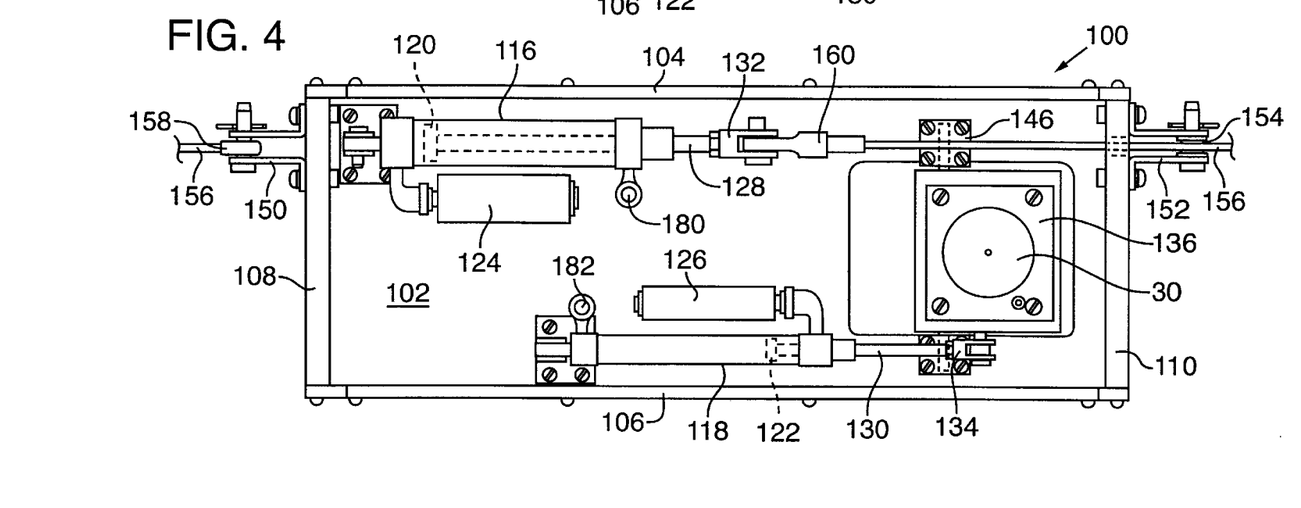
FIG. 4 is a plan view of the protective housing and telemetry package of FIG. 3 showing the tire inflation gas pressure actuated cylinders in a tire inflated position for respectively clamping the housing to the wheel and positioning the telemetry package in an operational orientation.
Figure 5:
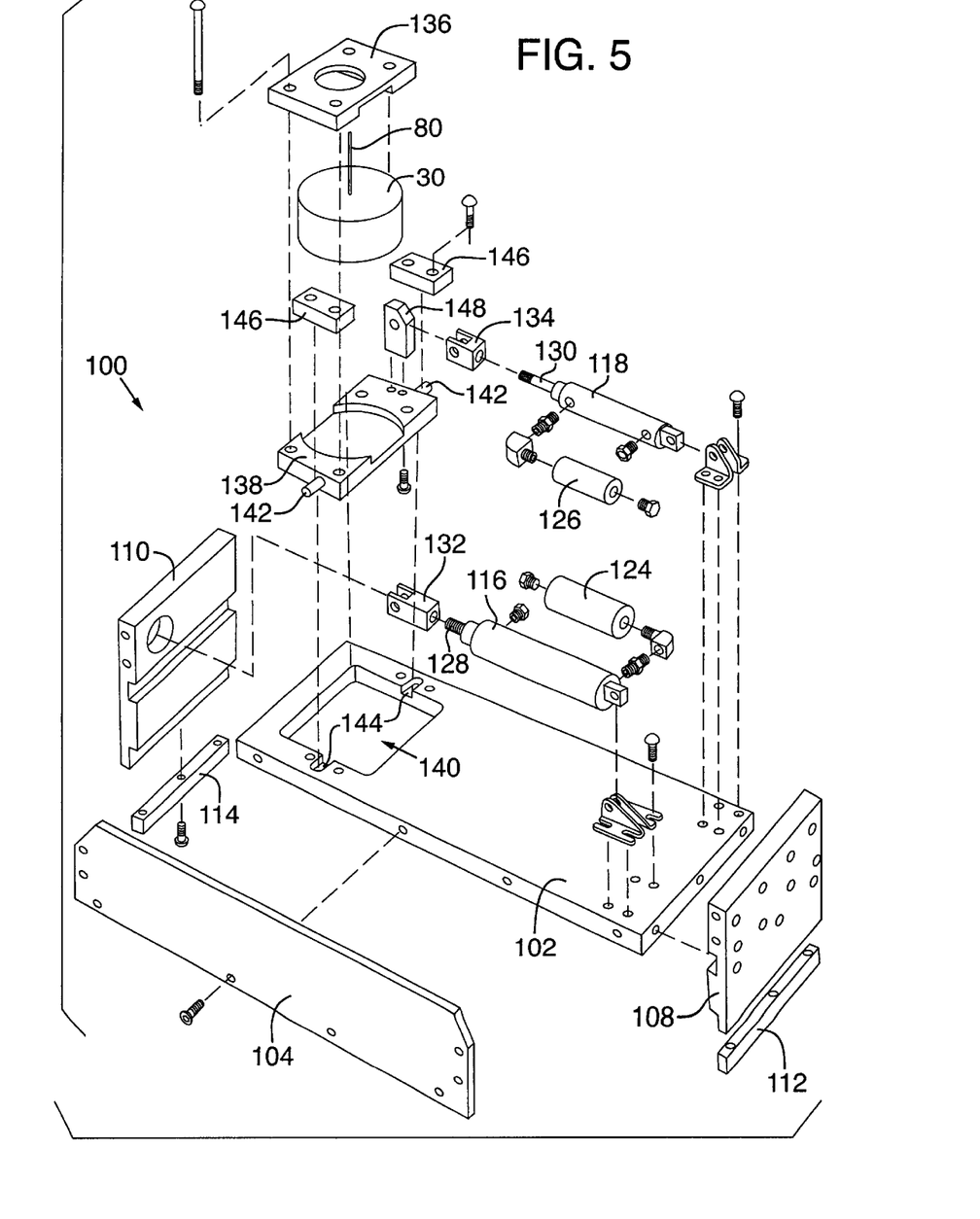
FIG. 5 is an exploded assembly view of the protective housing, telemetry package, and tire inflation gas pressure actuated cylinders of FIGS. 3 and 4.
Figure 7:
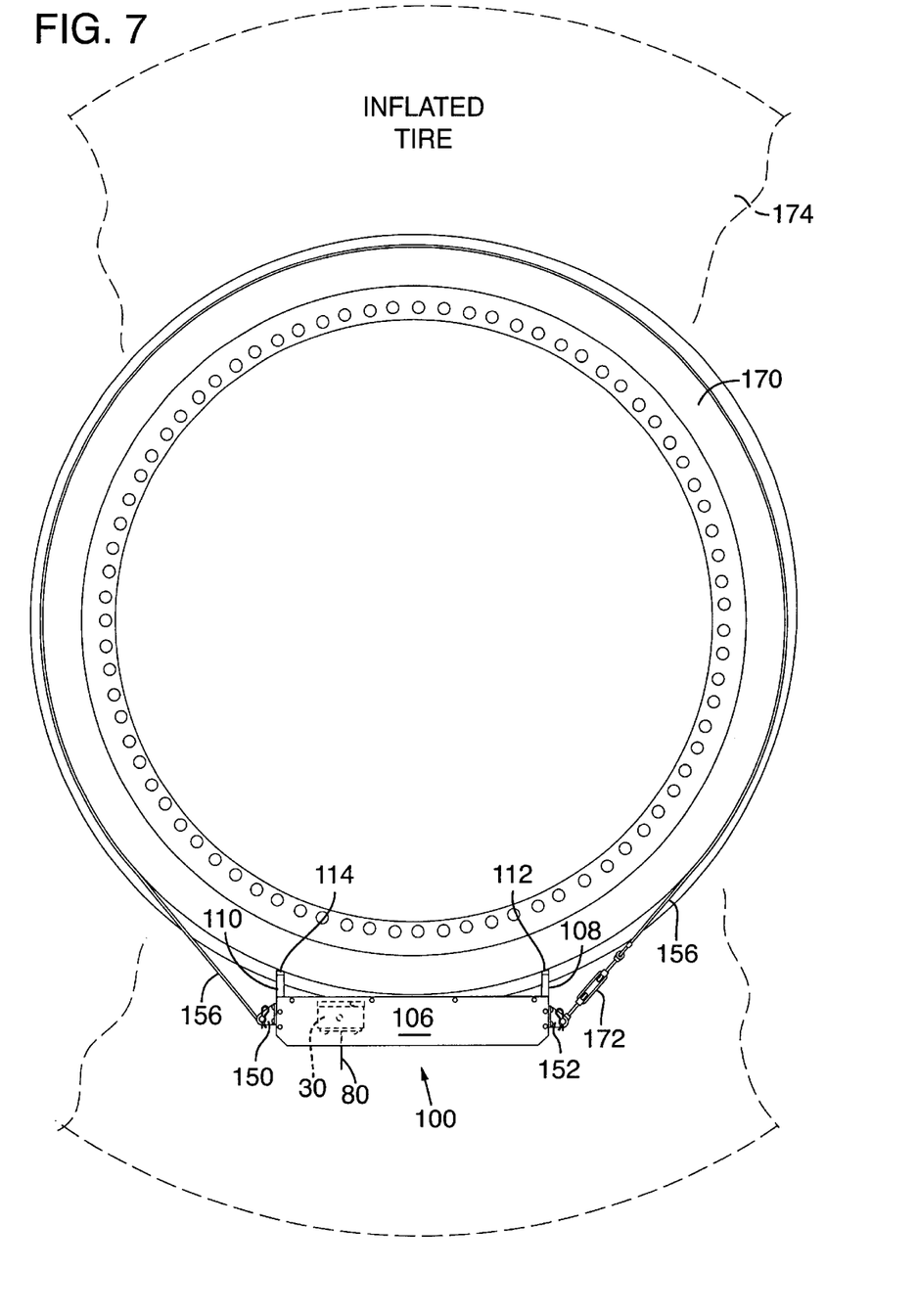
FIG. 7 is a sectional side view of the protective housing and telemetry package of FIGS. 3–5 shown inside an inflated tire with the telemetry package in the operational orientation and the housing secured to the wheel by a taut cable.

FIGS. 3, 4, and 5 show telemetry system 30 placed within a protective housing 100 having a base plate 102, attached to which are side plates 104 and 106 that extend above base plate 102, and end plates 108 and 110 that extend above and below base plate 102. Side plates 104 and 106 and the upward extending portions of end plates 108 and 110 together form protective walls for telemetry system 30 with base plate 102 forming a protective floor. The lower extending portions of end plates 108 and 110 form supports to which are attached skid plates 112 and 114 for supporting protective housing 100 against and a wheel (FIG. 7). Skid plates 112 and 114 are preferably formed from well-known ultra-high molecular weight plastic to protect the wheel from mechanical damage and electrolysis.

Protective housing 100 further encloses tire inflation gas pressure actuated first and second cylinders 116 and 118 in which respective first and second pistons 120 and 122 (shown in phantom lines) are biased in respective extended (FIG. 3) and retracted (FIG. 4) positions by gas pressure stored in respective first and second gas pressure reservoirs 124 and 126. The preferred range of gas pressure stored in reservoirs 124 and 126 is about 100 psig to about 300 psig. First and second pistons 120 and 122 are attached to respective first and second connecting rods 128 and 130 that terminate in respective first and second clevis fittings 132 and 134. First and second cylinders 116 and 118 are preferably model Nos. UDR-20-4 and UDR-12-2, manufactured by Clippard Instrument Laboratory, located in Cincinnati, Ohio.

Telemetry system 30 is captured between an upper mounting plate 136 and a lower mounting plate 138. Base plate 102 includes an opening 140 sized to receive with clearance lower mounting plate 138. Lower mounting plate 138 further includes hinge pins 142 that protrude from its opposite side margins. Base plate 102 includes recesses 144 in opposite marginal edges of opening 140 sized and positioned to receive hinge pins 142. Telemetry system 30 is attached within opening 140 to base plate 102 by plates 146 that captivate hinge pins 142 within recesses 144. Lower mounting plate 138 further includes a tongue 148 that protrudes from its upper major surface. Tongue 148 is pivotally connected to second clevis fitting 134 by a clevis pin such that when second connecting rod 130 is in the retracted position shown in FIG. 3, telemetry system 30 is pivoted to a protected orientation with antenna 80 close to base plate 102. On the other hand, when second connecting rod 130 is in the extended position shown in FIG. 4, telemetry system 30 is pivoted to an operational orientation with antenna 80 substantially perpendicular to base plate 102.

Regarding the operation of first cylinder 116 and first connecting rod 128, third and fourth clevis fittings 150 and 152 are attached respectively to end plates 108 and 110. A pulley 154 is rotatably attached within fourth clevis 152 by a clevis pin. A tether, such as a cable 156 has a first end terminating in a swage fitting 158 that is attached to third clevis fitting 150 by a clevis pin, and a second end terminating in a swage fitting 160 that is attached to first clevis fitting 132 by another clevis pin.

Figure 6:
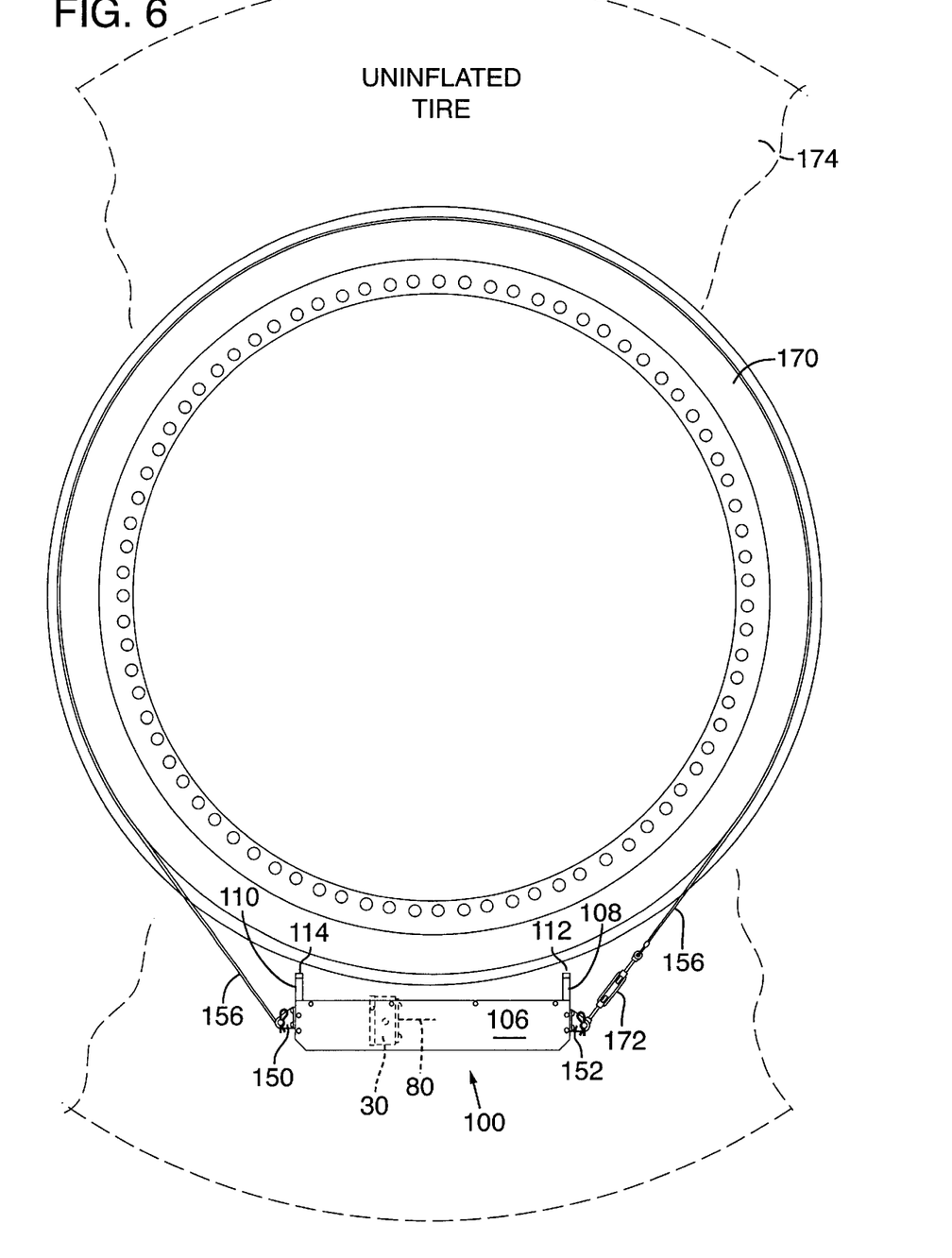
FIG. 6 is a sectional side view of the protective housing and telemetry package of FIGS. 3–5 shown inside an uninflated tire with the telemetry package in the protected orientation and the housing loosely suspended from a wheel by a slack cable.

Also referring to FIGS. 6 and 7, protective housing 100 is suspended by cable 156 below a wheel 170. Cable 156 runs from third clevis fitting 152, over wheel 170, over pulley 154 in fourth clevis fitting 152, through an opening in end plate 110, and connects to first clevis fitting 132 on the end of first connecting rod 128. Cable 156 is of such a length that when first connecting rod 128 is in the extended position shown in FIG. 3, cable 156 is slack and protective housing 100 is suspended away from wheel 170 as shown in FIG. 6. Cable 156 may further include an optional turnbuckle 172 for adjusting its length appropriately. On the other hand, when first connecting rod 128 is in the retracted position shown in FIG. 4, cable 156 is drawn taut and protective housing 100 is drawn into firm contact with wheel 170 as shown in FIG. 7.

The extension and retraction of first and second connecting rods 128 and 130 is controlled by tire inflation gas pressure confined within a tire 174 mounted to wheel 170. FIGS. 6 and 7 represent tire 174 in respective uninflated and inflated conditions, and FIGS. 3 and 4 represent the positions of first and second connecting rods 128 and 130 when tire 174 is in the respective uninflated and inflated conditions.

Referring again to FIG. 3, first cylinder 116 includes a gas pressure port 180 that exposes the connecting rod side of first piston 120 to the ambient air or inflation gas pressure of tire 174. When tire 174 is uninflated, the gas pressure stored in first reservoir 124 overcomes the ambient pressure and urges first piston 120 and first connecting rod 128 to the extended position. Likewise, second cylinder 118 includes a gas pressure port 182 that exposes the non-connecting rod side of second piston 122 to the ambient air or inflation gas pressure of tire 174. When tire 174 is uninflated, the gas pressure stored in second reservoir 126 overcomes the ambient pressure and urges second piston 122 and second connecting rod 130 to the retracted position.

Referring again to FIG. 4, when tire 174 is inflated, the gas pressure stored in first reservoir 124 is overcome by the inflation gas pressure, which urges first piston 120 and first connecting rod 128 to the retracted position. Likewise, when tire 174 is inflated, the gas pressure stored in second reservoir 126 is overcome by the inflation gas pressure, which urges second piston 122 and second connecting rod 130 to the extended position.

Accordingly, when tire 174 is uninflated as shown in FIG. 6, cable 156 is slack causing protective housing 100 to be loosely suspended below wheel 170, and telemetry system 30 is pivoted into the protected orientation. This configuration allows easy mounting of protective housing 100 to wheel 170 and protects telemetry system 30 during tire changes.

On the other hand, when tire 174 is inflated as shown in FIG. 7, cable 156 is taut causing protective housing 100 to be drawn tightly against wheel 170, and telemetry system 30 is pivoted into the operational orientation.

An advantage of this invention is that it eliminates the need for drilling mounting holes in wheel 170 and, thereby, prevents weakening of wheel 170. Another advantage is that it provides sufficient separation of antenna 80 from the floor of tire 170 to provide adequate communications efficiency of data transceiver 74 through the side walls of tire 170. Yet another advantage is that protective housing 100 is prevented from contacting and potentially damaging any inner surfaces of tire 174.

In operation, a vehicle, such as mining ore truck 10 (FIG. 1), has a tire pressure and temperature telemetry system 30 installed within protective housing 100 and slung around the wheels of mounting each of tires 14 and 18. When ore mining truck 10 approaches remote measurement system 82, an operator commands processor 88 to interrogate each telemetry system 30 regarding the current inflation gas parameters inside each of tires 14 and 18. Processor 88 conveys the command to data transceiver 84 that transmits in sequence an interrogation burst to each of data transceivers 74, which each in turn exit standby mode, retrieve from the memory of associated controller 76 the inflation gas parameter data, and transmit the retrieved data to remote measurement system 82.

Processor 88 stores in memory 90 the current inflation gas parameter data associated with each of tires 14 and 18 and follows the process or processes described in the above-mentioned U.S. Pat. No. 6,025,777 and copending application Ser. No. 09/800,599.

Skilled workers will recognize that portions of this invention may be implemented differently from the implementations described above for preferred embodiments. For example, a single cylinder may be employed to perform single or multiple functions, such as tightening a cable, pivoting a housing, or actuating a switch or other mechanism. Also, additional cylinders may be employed for various purposes, such as actuating electrical power to conserve battery life. The protective housing may be enclosed or have other shapes that eliminate the need for pivoting the telemetry system. This invention may also be employed for mounting other than inflation gas monitoring systems inside tires. The invention may be implemented with other than the sensors, batteries, and electronic and mechanical components described above. For example, the data transceivers may employ other frequencies and modulation types or may be deleted in favor of a device that employs inductive or capacitive coupling directly through the tire. In the latter alternative, the vehicle may need to be stopped and the device held against the tire. Finally, this invention can be adapted to work with many different tire and wheel shapes, sizes, and applications in addition to off-the-road mining truck tire, including automobile, aircraft, and truck tires.

It will be obvious to those having skill in the art that many changes may be made to the details of the above-described embodiments of this invention without departing from the underlying principles thereof. Accordingly, it will be appreciated that this invention is also applicable to apparatus mounting applications other than those found in the inflation gas monitoring of heavy truck tires. The scope of the present invention should, therefore, be determined only by the following claims.

We claim:

1. An apparatus for securing a housing to a wheel supporting a tire that is inflated by an inflation gas pressure, comprising:
   a first cylinder coupled to the housing, the first cylinder containing a first piston and a first connecting rod that is movable in first and second directions;
   a biasing device providing a pressure less than the inflation gas pressure for urging the piston and the first connecting rod in the first direction, the piston and the first connecting rod being movable in the second direction by the inflation gas pressure; and
   a tether coupling together the housing, the wheel, and the first connecting rod such that when the tire is uninflated, the tether is made slack by the movement of the first connecting rod in the first direction, and when the tire is inflated by the inflation gas pressure, the tether is drawn taut by the movement of the first connecting rod in the second direction, thereby securing the housing to the wheel.

2. The apparatus of claim 1 in which the tether includes a cable.

3. The apparatus of claim 1 in which the biasing device includes a gas pressure reservoir.

4. The apparatus of claim 1 in which the tire is an off-the-road vehicle tire.

5. The apparatus of claim 1 further comprising:
   a package coupled to the housing, the package movable to first and second orientations;
   a second cylinder coupled to the housing, the second cylinder containing a piston and a second connecting rod that is movable in third and fourth directions;
   a biasing device providing a pressure less than the inflation gas pressure for urging the piston and the second connecting rod in a third direction, the piston and the first connecting rod being movable in the fourth direction by the inflation gas pressure; and
   a mechanism coupling together the package and the second connecting rod such that when the tire is uninflated, the package is moved to the first orientation by the movement of the second connecting rod in the third direction, and when the tire is inflated by the inflation gas pressure, the package is moved to the second orientation by the movement of the second connecting rod in the fourth direction.

6. The apparatus of claim 5 in which the first orientation includes a protective orientation, and the second orientation includes an operational orientation.

7. The apparatus of claim 5 in which the third and fourth directions are substantially parallel to the first and second directions.

8. The apparatus of claim 5 in which the package includes a telemetry system for transmitting to a remote receiver data indicative of at least one inflation gas parameter.

9. The apparatus of claim 8 in which the inflation gas parameter includes a pressure, a temperature, or an oxygen concentration.

10. A method for securing a housing to a wheel supporting a tire that is inflated by an inflation gas pressure, comprising:
    coupling a first cylinder to the housing, the first cylinder containing a first piston and a first connecting rod that is movable in first and second directions;
    urging the piston and the first connecting rod in the first direction with a pressure less than the inflation gas pressure, the piston and the first connecting rod being movable in the second direction by the inflation gas pressure;
    coupling together the housing and the first connecting rod with a tether;
    slinging the tether around the wheel while the tether is slack because of the movement of the first connecting rod in the first direction;
    mounting the tire to the wheel;
    inflating the tire with the inflation gas pressure to draw the tether taut by the movement of the first connecting rod in the second direction, thereby securing the housing to the wheel.

11. The method of claim 10 in which the tether includes a cable.

12. The method of claim 10 in which the urging the piston and first connecting rod in the first direction employs a gas pressure reservoir.

13. The method of claim 10 in which the tire is an off-the-road vehicle tire.

14. The method of claim 10 further comprising:

coupling a package to the housing, the package being movable to first and second orientations;

coupling a second cylinder to the housing, the second cylinder containing a piston and a second connecting rod that is movable in third and fourth directions;

urging the piston and the second connecting rod in a third direction with a pressure less than the inflation gas pressure, the piston and the second connecting rod being movable in the fourth direction by the inflation gas pressure; and coupling together the package and the second connecting rod such that when the tire is uninflated, the package is moved to the first orientation by the movement of the second connecting rod in the third direction, and when the tire is inflated by the inflation gas pressure, the package is moved to the second orientation by the movement of the second connecting rod in the fourth direction.

15. The method of claim 14 in which the first orientation includes a protective orientation, and the second orientation includes an operational orientation.

16. The method of claim 14 in which the third and fourth directions are substantially parallel to the first and second directions.

17. The method of claim 14 in which the package includes a telemetry system for transmitting to a remote receiver data indicative of at least one inflation gas parameter.

18. The method of claim 17 in which the inflation gas parameter includes a pressure, a temperature, or an oxygen concentration.

* * * * *